United States Patent
Kang (10) Patent No.: US 9,256,050 B2
(45) Date of Patent: Feb. 9, 2016

(54) LENS BARREL ASSEMBLY AND PHOTOGRAPHING APPARATUS INCLUDING THE SAME

(71) Applicant: SAMSUNG ELECTRONICS CO., LTD., Suwon-si, Gyeonggi-do (KR)

(72) Inventor: Yoon-seok Kang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 163 days.

(21) Appl. No.: 13/845,584

(22) Filed: Mar. 18, 2013

(65) Prior Publication Data
US 2014/0028900 A1 Jan. 30, 2014

(30) Foreign Application Priority Data

Jul. 26, 2012 (KR) .................. 10-2012-0081968

(51) Int. Cl.
G02B 7/10 (2006.01)
H04N 5/225 (2006.01)
G03B 3/10 (2006.01)

(52) U.S. Cl.
CPC .... *G02B 7/10* (2013.01); *G02B 7/102* (2013.01); *G03B 3/10* (2013.01); *H04N 5/2254* (2013.01); *G03B 2205/0046* (2013.01); *G03B 2205/0053* (2013.01)

(58) Field of Classification Search
None
See application file for complete search history.

(56) References Cited

U.S. PATENT DOCUMENTS

| | | | |
|---|---|---|---|
| 5,739,963 A * | 4/1998 | Kato | G02B 7/102 359/702 |
| 5,790,903 A | 8/1998 | Iwasaki et al. | |
| 5,867,740 A * | 2/1999 | Hamasaki | G02B 7/10 359/700 |
| 7,352,515 B1 | 4/2008 | Devenyi | |
| 2001/0028512 A1 | 10/2001 | Noguchi | |
| 2002/0135900 A1* | 9/2002 | Nomura et al. | 359/819 |
| 2004/0042778 A1 | 3/2004 | Nomura | |
| 2005/0111113 A1* | 5/2005 | Shirie | 359/701 |
| 2005/0185950 A1* | 8/2005 | Omiya et al. | 396/349 |

(Continued)

FOREIGN PATENT DOCUMENTS

| | | |
|---|---|---|
| GB | 2 309 541 A | 7/1997 |
| JP | 08-110454 A | 4/1996 |

(Continued)

OTHER PUBLICATIONS

PCT Search Report and Written Opinion established for PCT/KR2013/003902 (Aug. 19, 2013).

(Continued)

*Primary Examiner* — Michael Osinski
(74) *Attorney, Agent, or Firm* — Drinker Biddle & Reath LLP (57) ABSTRACT

A lens barrel assembly includes: a lens barrel that is rotatable about an optical axis and is movable in a direction along the optical axis; a moving plate that is combined with the lens barrel so that the moving plate is rotated together with the lens barrel and is movable with respect to the lens barrel in the direction along the optical axis; a power transmission unit that is installed on the moving plate and transmits an outside rotation force to the lens barrel via the moving plate; and a stopper that is disposed on a path on which the moving plate moves in the direction along the optical axis and that limits a movement of the moving plate in the direction along the optical axis in a partial section of the path on which the lens barrel is moved.

13 Claims, 9 Drawing Sheets

(56) References Cited

U.S. PATENT DOCUMENTS

| | | | |
|---|---|---|---|
| 2007/0092246 A1* | 4/2007 | Aoki et al. | 396/462 |
| 2008/0055027 A1* | 3/2008 | Kayama et al. | 335/222 |
| 2008/0174891 A1* | 7/2008 | Kudoh | 359/825 |
| 2008/0247063 A1* | 10/2008 | Otsuki et al. | 359/824 |
| 2009/0185286 A1 | 7/2009 | Shirakata | |
| 2010/0027138 A1* | 2/2010 | Terada | 359/817 |
| 2010/0061712 A1* | 3/2010 | Akabane et al. | 396/439 |
| 2011/0158621 A1 | 6/2011 | Honsho et al. | |
| 2011/0273777 A1* | 11/2011 | Koyama et al. | 359/611 |
| 2012/0105988 A1* | 5/2012 | Hung et al. | 359/830 |
| 2012/0188659 A1 | 7/2012 | Kudoh | |
| 2012/0314114 A1* | 12/2012 | Migita et al. | 348/333.1 |
| 2013/0162860 A1* | 6/2013 | Uehara et al. | 348/222.1 |

FOREIGN PATENT DOCUMENTS

| | | |
|---|---|---|
| JP | 10-133091 A | 5/1998 |
| JP | 11-095287 A | 4/1999 |
| JP | 2002-214507 A | 7/2002 |
| JP | 2008-175921 A | 7/2008 |
| JP | 2009-145590 A | 7/2009 |
| JP | 2009-169302 A | 7/2009 |

OTHER PUBLICATIONS

Search Report established for EP 13166263.7 (Nov. 4, 2013).

* cited by examiner

Figure 1:
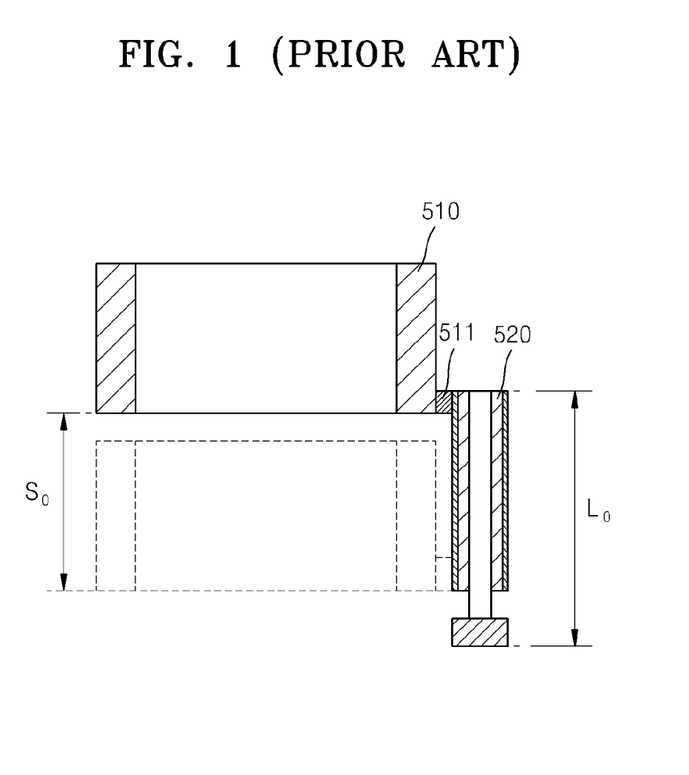
FIG. 1 is a schematic cross-sectional view of a structure of a lens barrel assembly, according to the related art.

FIG. 14 ered to the length of the drive gear 520. Thus, the stroke length of the lens barrel 510 and the length of the drive gear 520 are limitations in minimizing the thickness of the photographing apparatus.

LENS BARREL ASSEMBLY AND PHOTOGRAPHING APPARATUS INCLUDING THE SAME

CROSS-REFERENCE TO RELATED PATENT APPLICATION

This application claims the priority benefit of Korean Patent Application No. 10-2012-0081968, filed on Jul. 26, 2012, in the Korean Intellectual Property Office, the disclosure of which is incorporated herein in its entirety by reference.

BACKGROUND

1. Field

Various embodiments relate to a lens barrel assembly and a photographing apparatus including the same, and more particularly, to a lens barrel assembly that may have a small thickness and a photographing apparatus including the lens barrel assembly.

2. Related Art

A lens barrel assembly that is mounted on photographing apparatuses, such as digital still cameras (DSCs), digital video cameras, and the like, adjusts a distance between lens groups, thereby implementing an optical system having various focal lengths. Since an optical system of a camera can be converted into a wide-angle lens or a telephoto lens by using the lens barrel assembly, a user can perform a photographing operation at various viewing angles from his/her standing position without moving.

As compact DSCs require a high-performance 5-times zooming function, for example, the lens barrel assembly is required to have a small thickness and a high-performance zooming function.

In order to adjust a distance between lens groups, a relative position of barrels in the lens barrel assembly that support the lens groups is changed. Driving devices, such as a motor and a gear, are used to move the barrels. Since the length of the gear that rotates the barrels is required to correspond to a moving distance of the barrels, there is a limitation in minimizing the thickness of a photographing apparatus.

FIG. 1 is a schematic cross-sectional view of a structure of a lens barrel assembly, according to the related art.

FIG. 1 schematically illustrates an operation of a lens barrel of a lens barrel assembly, according to the related art disclosed in U.S. Pat. No. 7,751,126. U.S. Pat. No. 7,751,126 discloses the configuration of a motor and a gear that rotate a barrel, the gear being installed on a surface of the barrel.

Referring to FIG. 1, a gear 511 is fixedly installed at an outer peripheral surface of a barrel 510, and a drive gear 520 is installed at an outside area of the barrel 510. As illustrated in FIG. 1, if a stroke length of the barrel 510 is $S_0$, the drive gear 520 needs to rotate the gear 511 while maintaining the contact with the gear 511 at the outer peripheral surface of the barrel 51. Thus, the drive gear 520 is required to have a length $L_0$ according to the stroke $S_0$.

As described above, in the lens barrel assembly according to the related art, a gear 511 is fixedly installed at an outer peripheral surface of the lens barrel 510 that is moved. Thus, a photographing apparatus including the lens barrel assembly is required to have a thickness corresponding to the length of the drive gear 520. Thus, the stroke length of the lens barrel 510 and the length of the drive gear 520 are limitations in minimizing the thickness of the photographing apparatus.

SUMMARY

Various embodiments provide a lens barrel assembly having a zooming function, and a photographing apparatus including the lens barrel assembly.

Various embodiments also provide a lens barrel assembly that may have a small thickness and may allow a lens barrel to have an appropriate stroke length, and a photographing apparatus including the lens barrel assembly.

Various embodiments also provide a lens barrel assembly that may allow the minimization of the size of a power transmission unit for transmitting a driving force for driving a lens barrel, and a photographing apparatus including the lens barrel assembly.

According to an embodiment, a lens barrel assembly includes: a lens barrel that is rotatable about an optical axis and is movable in a direction along the optical axis; a moving plate that is combined with the lens barrel so that the moving plate is rotated together with the lens barrel and is movable with respect to the lens barrel in the direction along the optical axis; a power transmission unit that is installed on the moving plate and transmits an outside rotation force to the lens barrel via the moving plate; and a stopper that is disposed on a path along which the moving plate moves in the direction along the optical axis and that limits a movement of the moving plate in the direction along the optical axis in a partial section of the path on which the lens barrel is moved.

The lens barrel may include a guide groove that extends in a direction substantially parallel to the optical axis, and the moving plate may be inserted in the guide groove so as to be movable along an extension direction of the guide groove.

The guide groove may be formed on an outside surface of the lens barrel.

The guide groove may include wedge grooves that are formed in edges into which the moving plate is inserted and that are inclined from the outside of the lens barrel in a radial direction of the lens barrel toward the inside of the lens barrel, and the moving plate may include wedges corresponding to the wedge grooves.

The lens barrel assembly may further include an external barrel that includes a first cam groove that guides a movement of a first protrusion of the lens barrel and is disposed outside the lens barrel, the moving plate may include a long hole that extends in the direction substantially parallel to the optical axis, and the first protrusion of the lens barrel may pass through the long hole and may protrude outwardly to be connected to the first cam groove.

The lens barrel assembly may further include a driving unit, the moving plate may extend along at least a portion of the lens barrel in a circumferential direction of the lens barrel, the power transmission unit may include a plurality of gear teeth formed on an outer peripheral surface of the moving plate along a circumferential direction of the moving plate, the external barrel may include an external long hole through which the plurality of gear teeth are exposed to the outside, and the driving unit may rotate the gear teeth through the external long hole.

The stopper may be installed inside the external barrel.

The lens barrel assembly may further include a movement frame that is disposed inside the lens barrel, supports an optical element, includes a second protrusion that protrudes outwardly; and a cam barrel that includes a second cam groove through which the second protrusion passes, and is disposed between the movement frame and the lens barrel so as to guide the movement frame to be movable with respect to the lens barrel, the lens barrel may include a straight-shaped groove that extends substantially parallel to the optical axis, and the second protrusion of the movement frame may be inserted into the straight-shaped groove.

The guide groove may be formed inside the lens barrel.

The power transmission unit may include a frictional ring that is formed on a surface of the moving plate and extends along the circumferential direction of the moving plate; and a transmission element that contacts the frictional ring, is rotated and transmits a driving force from outside to the moving plate.

The lens barrel may include a straight-shaped protrusion that protrudes from an outer surface of the lens barrel and extends substantially parallel to the optical axis, and the moving plate may include a straight-shaped guide groove into which the straight-shaped protrusion is inserted.

According to another embodiment, a photographing apparatus includes: a lens barrel assembly including a lens barrel that is rotatable around an optical axis and is movable in a direction along the optical axis, a moving plate that is combined with the lens barrel so that the moving plate is rotated together with the lens barrel and is movable with respect to the lens barrel in the direction along the optical axis, a power transmission unit that is installed on the moving plate and transmits an outside rotation force to the lens barrel via the moving plate, and a stopper that is disposed on a path along which the moving plate moves in the direction along the optical axis and that limits a movement of the moving plate in the direction along the optical axis in a partial section of the path on which the lens barrel is moved; and an image capturing element that converts light passing through the lens barrel assembly into an electrical signal.

BRIEF DESCRIPTION OF THE DRAWINGS

The above and other features and advantages will become more apparent by describing in detail exemplary embodiments thereof with reference to the attached drawings in which.

DETAILED DESCRIPTION

Hereinafter, various embodiments the invention will be described in detail by explaining exemplary embodiments with reference to the attached drawings.

Figure 2:
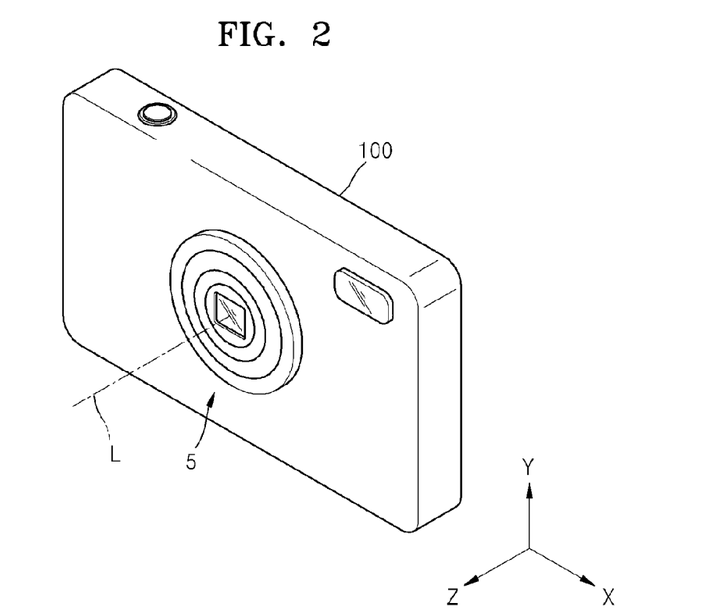
FIG. 2 is a perspective view of a lens barrel assembly according to an embodiment and a photographing apparatus including the lens barrel assembly.
Figure 3:
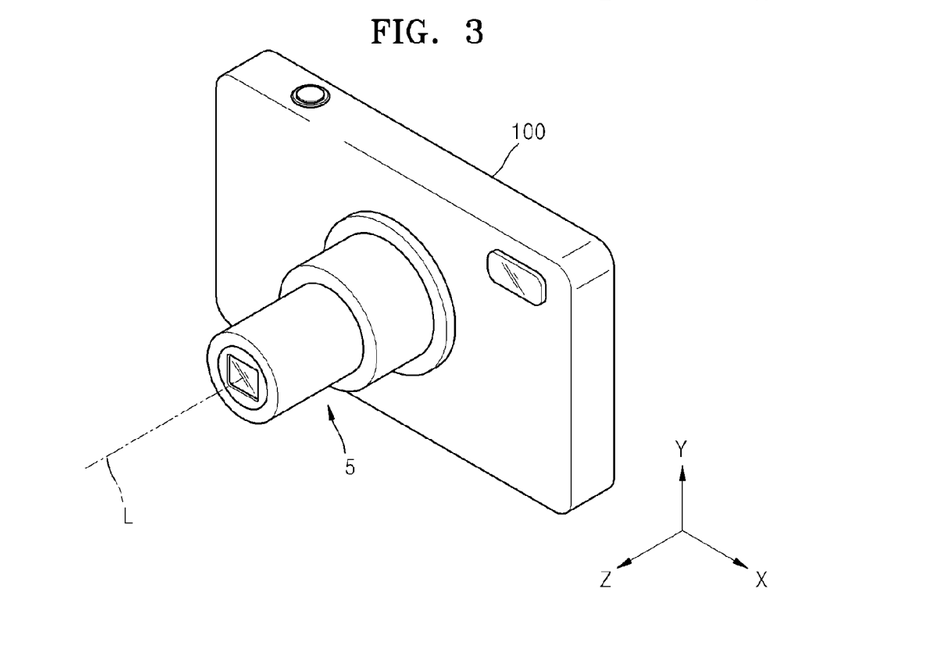
FIG. 3 is a perspective view illustrating an operating state of the lens barrel assembly illustrated in FIG. 2.

FIG. 2 is a perspective view of a lens barrel assembly 5 according to an embodiment and a photographing apparatus 100 including the lens barrel assembly 5. FIG. 3 is a perspective view illustrating an operating state of the lens barrel assembly 5 illustrated in FIG. 2.

Figure 4:
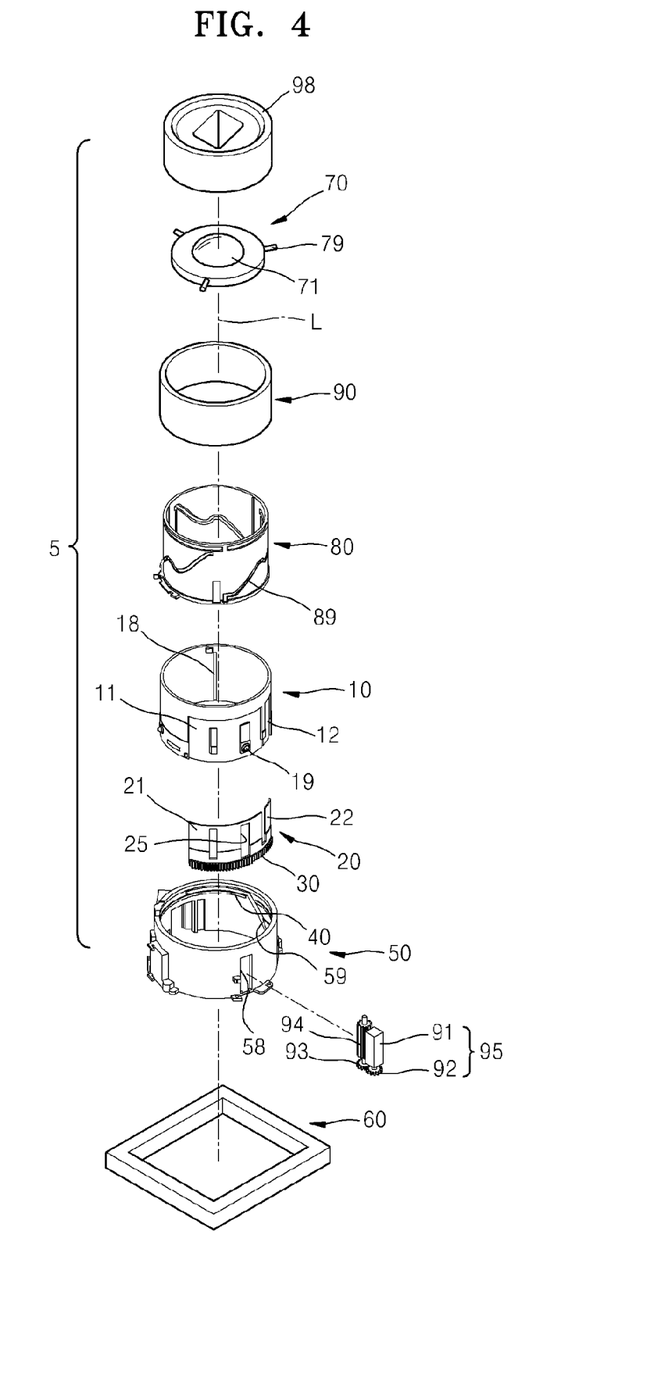
FIG. 4 is an exploded perspective view schematically illustrating the relationship between elements of the lens barrel assembly of the photographing apparatus of FIG. 2.

The photographing apparatus 100 illustrated in FIGS. 2 and 3 includes the lens barrel assembly 5 and an image capturing element (not shown; see FIG. 4). When the photographing apparatus 100 is not in operation, the lens barrel assembly 5 may be accommodated in the photographing apparatus 100, as illustrated in FIG. 2. When the photographing apparatus 100 is in operation, the lens barrel assembly 5 may be moved in a direction along an optical axis L so as to protrude from a front portion of the photographing apparatus 100, as illustrated in FIG. 3.

The lens barrel assembly 5 protrudes from the photographing apparatus 100 and extends to the outside so that an optical lens (not shown) of the lens barrel assembly 5 may be moved the direction along the optical axis L. Thus, the lens barrel assembly 5 may perform a zooming operation of adjusting a magnification ratio of an image of a subject, or a focus adjusting operation of adjusting a focus on the subject.

The photographing apparatus 100 that includes the lens barrel assembly 5 having the above structure may be a digital still camera (DSC) that captures a still image, a digital camcorder that captures a moving picture image, a camera module installed in a portable mobile device, or the like.

In FIGS. 2 and 3, the lens barrel assembly 5 may be a fixed-barrel type lens barrel assembly in which the lens barrel assembly 5 is fixedly mounted on the photographing apparatus 100. However, the invention is not limited thereto. Thus, the lens barrel assembly 5 may also be an interchangeable-barrel type lens barrel assembly that can be separated from or mounted on the photographing apparatus 100.

FIG. 4 is an exploded perspective view schematically illustrating the relationship between elements of the lens barrel assembly 5 of the photographing apparatus 100 of FIG. 2.

The lens barrel assembly 5 includes a barrel 10 that is movable in the direction along the optical axis L, a moving plate 20 that is combined with the barrel 10, a power transmission unit 30 that transmits a rotation force to the barrel 10 via the moving plate 20, a stopper 40 that limits the movement of the moving plate 20 in a section in which the barrel 10 is moved, and an external barrel 50.

An image capturing element 60 is installed in the photographing apparatus 100 of FIGS. 2 and 3. The image capturing element 60 converts light passing through the lens barrel assembly 5 into an electrical signal. The image capturing element may be a photoelectric transformation element, such as a charge coupled device (CCD), or a complementary metal oxide semiconductor (CMOS).

Light bouncing off a subject to be photographed passes through the lens barrel assembly 5 and reaches the image capturing element 60 so that an image of the subject is formed on the surface of the image capturing element 60. Each of the barrel 10 and the external barrel 50 of the lens barrel assembly 5 may include an optical lens (not shown).

The barrel 10 may be formed of plastic or metal, such as aluminum. The barrel 10 has a hollow cylindrical shape through which light can pass through. The barrel 10 may be rotated about the optical axis L or may be moved in the direction along the optical axis L. At least one first protrusion 19 is installed at an outer peripheral surface of the barrel 10. The first protrusion 19 is inserted into a first cam groove 59 of the external barrel 50, where the cam groove 59 is disposed outside of the barrel 10.

The moving plate 20 is combined with the barrel 10. That is, the moving plate 20 is coupled to the outside of the barrel 10 and may be rotated about the optical axis L together with the barrel 10. Since the moving plate 20 may be moved in a direction that is substantially parallel to the optical axis L with respect to the barrel 10, the position of the moving plate 20 in the direction along the optical axis L with respect to the barrel 10 may be changed while the barrel 10 is moving in the direction along the optical axis L.

In FIG. 4, the moving plate 20 is installed in guide grooves 11 and 12 formed in the outer peripheral surface of the barrel 10 so that the moving plate 20 may be movable in the direction that is substantially parallel to the optical axis L. The guide grooves 11 and 12 may extend to the outside of the moving plate 20 by a predetermined distance in the direction that is substantially parallel to the optical axis L. The moving plate 20 includes sliding wings 21 and 22 that are inserted into the guide grooves 11 and 12, respectively. The moving plate 20 may be inserted into the guide grooves 11 and 12 and may be moved along the extension direction of the guide grooves 11 and 12.

The moving plate 20 includes a long hole 25 that extends in a direction substantially parallel to the optical axis L. When the moving plate 20 is combined with the barrel 10, the first protrusion 19 installed on the barrel 10 passes through the long hole 25 of the moving plate 20, protrudes outside the moving plate 20, and is inserted into the first cam groove 59 of the external barrel 50.

The external barrel 50 is disposed on the outside of the barrel 10 and guides the barrel 10 to move in a rectilinear motion in the direction along the optical axis L, and the external barrel 50 simultaneously guides the barrel 10 to rotated about the optical axis L. A protective barrel 90 is disposed between the barrel 10 and the external barrel 50 and is moved in the direction along the optical axis L together with the barrel 10 so as to protect the barrel 10. A decoration ring 98 is installed at an end of the protective barrel 90 and is exposed to a front portion of the photographing apparatus 100.

The external barrel 50 has a hollow cylindrical shape. The external barrel 50 includes a first cam groove 59 that guides the first protrusion 19 of the barrel 10 that protrudes through the long hole 25 of the moving plate 20.

The first cam groove 59 is formed in the inner wall surface of the external barrel 50, extends along a circumferential direction of the external barrel 50, and is inclined in a direction that is substantially parallel to the optical axis L. The first cam groove 59 guides the first protrusion 19 of the barrel 10 as the barrel 10 is rotated, so that the barrel 10 may be moved in the direction along the optical axis L.

The moving plate 20 extends in a circumferential direction of the barrel along at least a portion of the barrel 10. The power transmission unit 30 is installed on the moving plate 20 and transmits a rotation force from the outside to the barrel 10 via the moving plate 20.

In the present embodiment, the power transmission unit 30 includes a plurality of gear teeth that are formed on an outer peripheral surface of the moving plate 20 along the circumferential direction of the moving plate 20. However, the invention is not limited thereto, and the power transmission unit 30 may be various other mechanical elements, such as a rubber ring that transmits power by frictional contact, a sprocket, and the like, as well as gear teeth.

Figure 5:
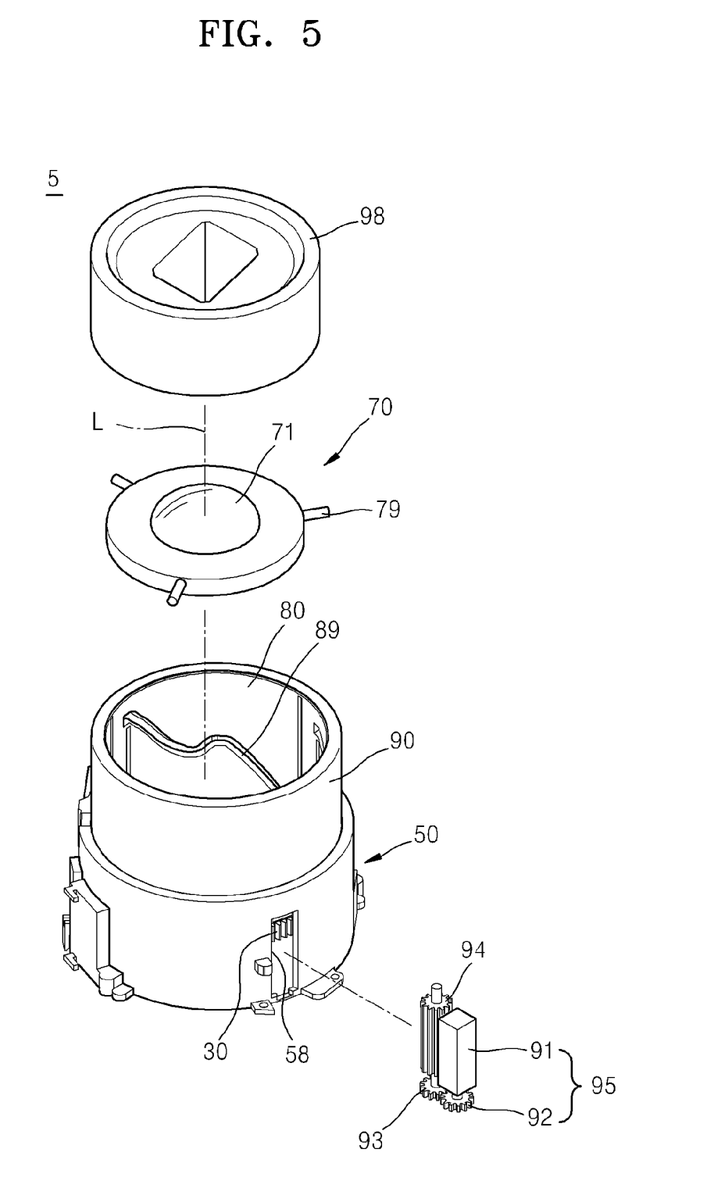
FIG. 5 is a schematic perspective view illustrating a state where some elements of the lens barrel assembly illustrated in FIG. 4 are combined with each other.

FIG. 5 is a schematic perspective view illustrating a state where some elements of the lens barrel assembly 5 illustrated in FIG. 4 are combined with each other.

The external barrel 50 includes an external long hole 58 through which the gear teeth of the power transmission unit 30 are exposed to the outside of the external barrel 50. Since the external long hole 58 extends in the direction that is approximately parallel to the optical axis L, the power transmission unit 30 may be exposed to the outside of the external barrel 50 while the barrel 10 and the moving plate 20 are moved along the direction of the optical axis L.

The driving unit 95 is disposed on the outside of the external barrel 50 and transmits a rotation force to the power transmission unit 30. The driving unit 95 includes a motor 91 that operates in response to an electrical signal and generates a driving force, a first gear 92 that is rotated by the motor 91, a second gear 93 that is rotated while engaged with the first gear 92, and a driving gear 94 that is rotated while connected to the second gear 93 on the same axis.

The driving gear 94 is combined with the power transmission unit 30 via the external long hole 58 of the external barrel 50. Thus, as the driving unit 95 operates, the driving gear 94 is rotated so as to transmit a rotation force to the power transmission unit 30.

A cam barrel 80 is disposed on the inside of the barrel 10 and includes a second cam groove 89 that extends along a circumferential direction of the barrel 10, and the second cam groove 89 is inclined with respect to the optical axis L. A movement frame 70 is disposed inside the cam barrel 80 and supports the lens 71 that is an optical element. The movement frame 70 includes a second protrusion 79 that protrudes outwardly.

The barrel 10 includes a straight-shaped groove 18 (see FIG. 4) that extends in a direction substantially parallel to the optical axis L. A second protrusion 79 of the movement frame 70 passes through the second cam groove 89 of the cam barrel 80 and is inserted into the straight-shaped groove 18 of the barrel 10.

Since the cam barrel 80, which is disposed between the barrel 10 and the movement frame 70, is fixed to the external barrel 50 and not to be rotated about the optical axis L, while the barrel 10 makes a rotation movement, the second protrusion 79 of the movement frame 70 inserted into the straight-shaped groove 18 may be guided by the second cam groove 89 of the cam barrel 80, and thus, may be moved along the direction of the optical axis L.

The position of the lens 71 in the direction of the optical axis L may be adjusted due to an operation of the movement frame 70 by the cam barrel 80 and the barrel 10, since the lens 71 is supported by the movement frame 70.

Figure 6:
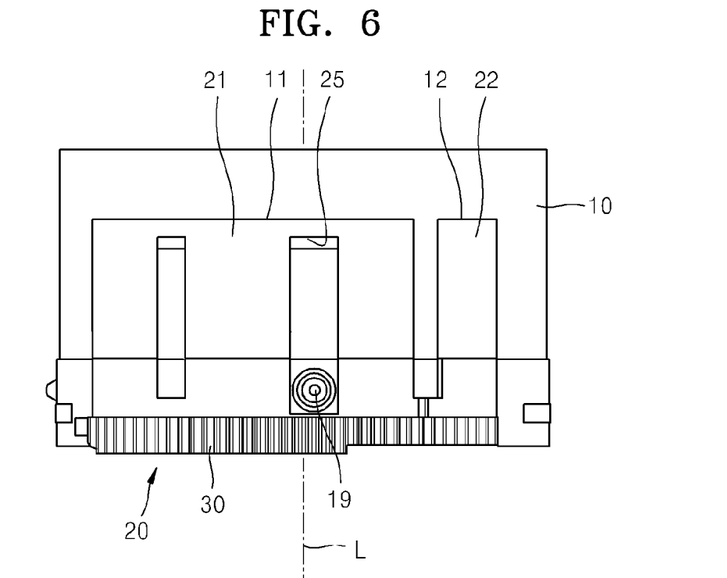
FIG. 6 is a side view illustrating a state where some elements of the lens barrel assembly of FIG. 4 are combined with each other.
Figure 7:
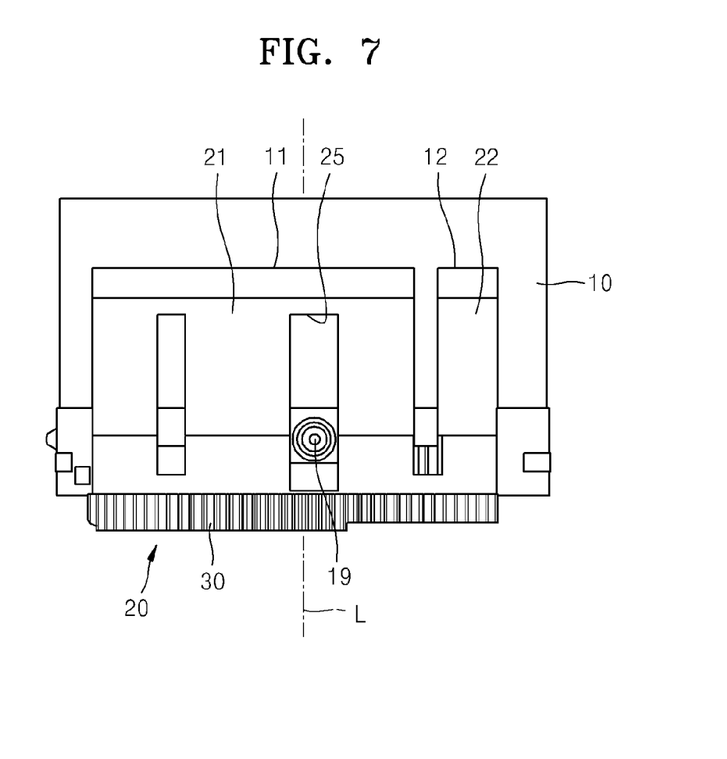
FIG. 7 is a side view illustrating a state where some elements of the lens barrel assembly of FIG. 4 operate.

FIG. 6 is a side view illustrating a state where some elements of the lens barrel assembly 5 of FIG. 4 are combined with each other, and FIG. 7 is a side view illustrating a state where some elements of the lens barrel assembly 5 of FIG. 4 operate.

Sliding wings 21 and 22 of the moving plate 20 are inserted into the guide grooves 11 and 12 of the barrel 10, and the first protrusion 19 of the barrel 10 protrudes outwardly through the long hole 25 of the moving plate 20. When a rotation force is transmitted to the barrel 10 via the power transmission unit 30 installed outside of the moving plate 20, a rotation force is also transmitted to the barrel 10 via the moving plate 20.

In addition, in a partial section in which the barrel 10 and the moving plate 20 are moved along the direction of the optical axis L, a movement of the moving plate 20 in the direction of the optical axis L is limited so that the moving plate 20 and the barrel 10 may be moved with respect to each other along the direction of the optical axis L. In this case, while the barrel 10 is continuously moved upwardly along the direction of the optical axis L, the moving plate 20 does not move so that a distance between the barrel 10 and the moving plate 20 increases, as illustrated in FIG. 7.

Figure 8:
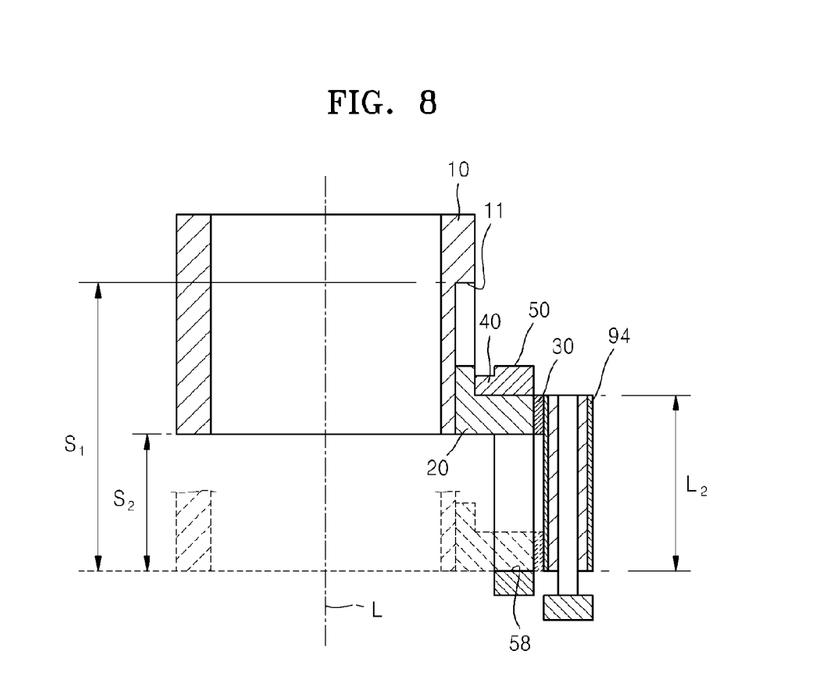
FIG. 8 is a side cross-sectional view schematically illustrating an operating state of the lens barrel assembly of FIG. 4.
Figure 9:
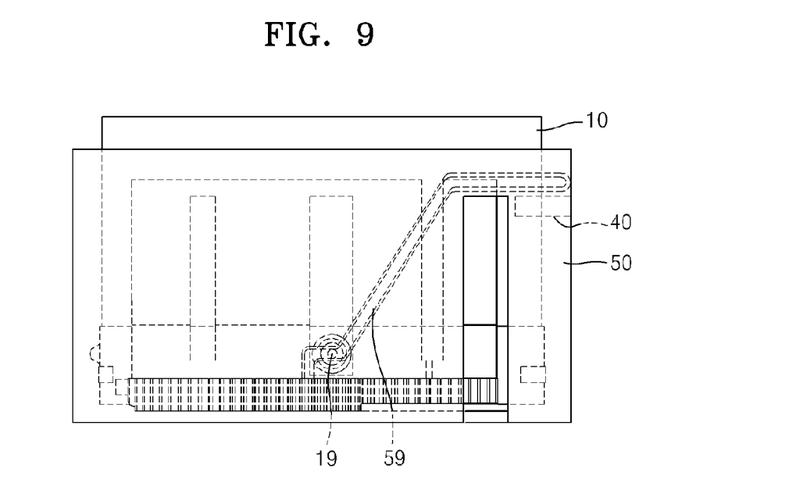
FIG. 9 is a side view illustrating an operating state of the lens barrel assembly of FIG. 4.
Figure 10:
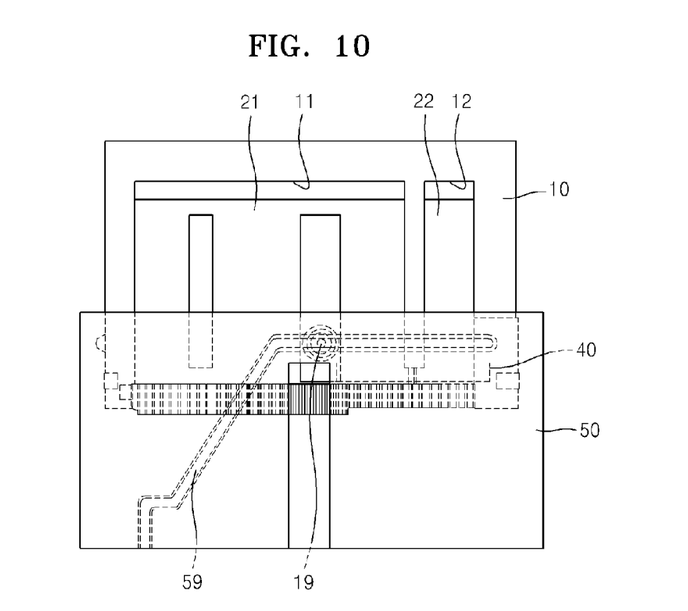
FIG. 10 is a side view illustrating another operating state of the lens barrel assembly of FIG. 4.

FIG. 8 is a side cross-sectional view schematically illustrating an operating state of the lens barrel assembly 5 of FIG. 4, FIG. 9 is a side view illustrating an operating state of the lens barrel assembly 5 of FIG. 4, and FIG. 10 is a side view illustrating another operating state of the lens barrel assembly 5 of FIG. 4.

Referring to FIG. 4 and FIGS. 8 through 10, a stopper 40 is disposed on a path along which the moving plate 20 moves in the direction along the optical axis L. The stopper 40 limits the movement of the moving plate 20 in the direction of the optical axis L in the partial section of the path in which the barrel 10 is moved in the direction along the optical axis L.

The stopper 40 is installed on the inside of the external barrel 50. In FIG. 8, when the barrel 10 and the moving plate 20 are moved upwardly along the direction of the optical axis L and reach the section in which the stopper 40 is located, the moving plate 20 contacts the stopper 40 and may not be moved upwardly any more.

Since the moving plate 20 is inserted into the guide groove 11 of the barrel 10, the barrel 10 and the moving plate 20 may be rotated about the optical axis L, and the barrel 10 may be moved with respect to the moving plate 20 in the direction of the optical axis L. Thus, as illustrated in FIG. 8, the power transmission unit 30 installed on the outside of the moving plate 20 may maintain continuous contact with the driving gear 94 so that the rotation force of the driving gear 94 may be transmitted to the moving plate 20.

If the position of the power transmission unit 30 is fixed at a particular point of the barrel 10, as in the related art, when the barrel 10 protrudes upwardly along the direction of the optical axis L, the power transmission unit 30 also moves upwardly along the barrel 10 to a higher position than the position depicted in FIG. 8. In this case, the length of the driving gear 94 needs to further extend along the direction of the optical axis L so as to contact the power transmission unit 30.

However, in the lens barrel assembly 5 according to the present embodiment, even when the barrel 10 is moved to the position S1, since the moving plate 20 that contacts the stopper 40 is maintained in a position S2, the length of the driving gear 94 in the direction of the optical axis L may be small so that the thicknesses L2 of the lens barrel assembly 5 and the photographing apparatus 100 in the direction of the optical axis L may be minimized.

In the present embodiment, the stopper 40 is disposed on the inside of the external barrel 50. However, the invention is not limited thereto. For example, when the external barrel 50 is not separably installed on the outside the barrel 10 but is installed directly on the main body of the photographing apparatus 100, a stopper may be installed on the main body of the photographing apparatus 100 at a specific position of the path along which the moving plate 20 moves in the main body of the photographing apparatus 100.

Figure 11:
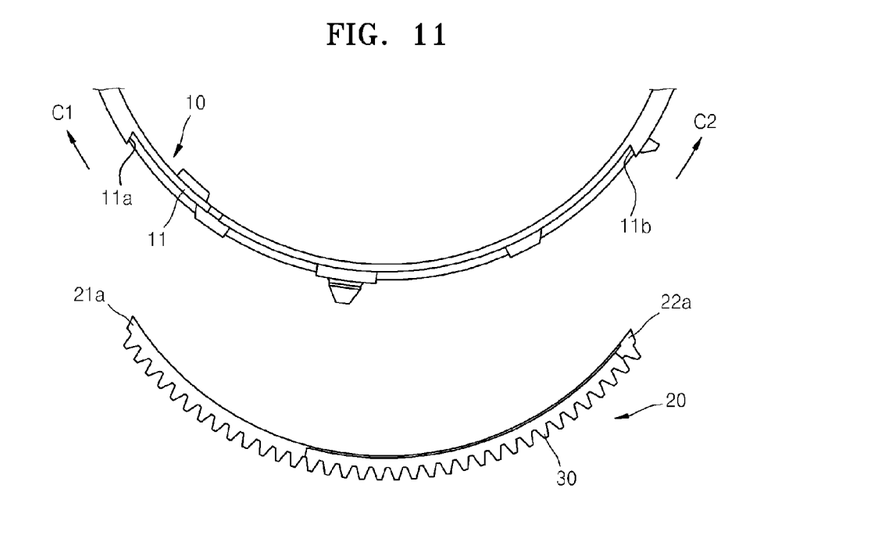
FIG. 11 is a plan view illustrating the combination relationship between some elements of the lens barrel assembly of FIG. 4.

FIG. 11 is a plan view illustrating the combination relationship between some elements of the lens barrel assembly 5 of FIG. 4.

Wedge grooves 11a and 11b are formed in edges of the guide groove 11 formed on the outside of the barrel 10 and are inclined from the outside of the barrel 10 in a radial direction of the barrel 10 to the inside of the barrel 10. The moving plate 20 may include wedges 21a and 22a disposed at both edges of the moving plate 20 so as to correspond to the wedge grooves 11a and 11b.

When the moving plate 20 is combined with the guide groove 11 of the barrel 10, the wedges 21a and 22a of the moving plate 20 is inserted into the wedge grooves 11a and 11b, respectively. When a rotation force is transmitted to the moving plate 20 via the power transmission unit 30 disposed on the outside of the moving plate 20, the moving plate 20 is rotated in a direction of C1 or C2 so as to transmit the rotation force to the barrel 10. Thus, when the moving plate 20 and the barrel 10 are rotated while moving rectilinearly, the moving plate 20 may be maintained stably in a combined state with the barrel 10.

Figure 12:
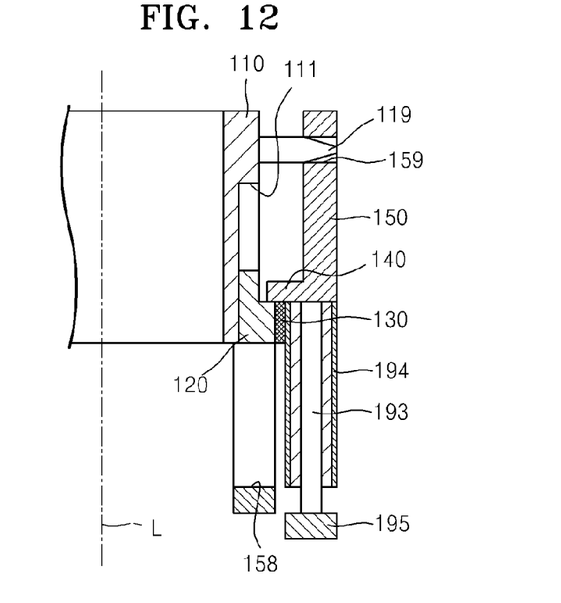
FIG. 12 is a side cross-sectional view schematically illustrating an operating state of a lens barrel assembly, according to another embodiment.

FIG. 12 is a side cross-sectional view schematically illustrating an operating state of a lens barrel assembly, according to another embodiment.

The lens barrel assembly illustrated in FIG. 12 includes a barrel 110 that is moved in the direction along the optical axis L or is rotated about the optical axis L, a moving plate 120 that is combined with the barrel 110 to be movable in the direction along the optical axis L, and a frictional ring 130 that is installed at the moving plate 120 and transmits a rotation force from the outside to the barrel 110 via the moving plate 120. The frictional ring 130 is an example of a power transmission unit. The frictional ring 130 is formed on a surface of the moving plate 120 and extends along a circumferential direction of the moving plate 120.

An external barrel 150 is disposed on the outside of the barrel 110. The external barrel 150 includes an external long hole 158 through which the frictional ring 130 is exposed to the outside. A rotation shaft 193 that is rotated by a driving unit 195 is disposed on the outside of the external barrel 150.

A transmission element 194 is installed on the outside of the rotation shaft 193 and contacts the frictional ring 130 via the external long hole 158. The frictional ring 130 and the transmission element 194 are manufactured of a material having a high frictional force, such as rubber. Thus, as the rotation shaft 193 is rotated, a rotation force is transmitted to the frictional ring 130 via the transmission element 194 so that the rotation force may be transmitted to the barrel 110 via the moving plate 120.

A first protrusion 119 is installed at an outside of the barrel 110 and is inserted into a first cam groove 159 of the external barrel 150. When the rotation force is transmitted to the frictional ring 130, the rotation force is transmitted to the barrel 110 via the moving plate 120 so that the moving plate 120 and the barrel 110 are rotated about the optical axis L together.

While the barrel 110 is rotated, the first protrusion 119 is guided by the first cam groove 159 so that the barrel 110 and the moving plate 120 make a rectilinear motion in the direction along the optical axis L. When the moving plate 120 contacts the stopper 140, the moving plate 120 does not move in the direction along the optical axis L any more, and the moving plate 120 remains inserted into the guide groove 111 of the barrel 110 so that the rotation force transmitted via the frictional ring 130 may be transmitted to the barrel 110 via the moving plate 120.

In the lens barrel assembly having the above structure, the length of the transmission element 194 for rotating the barrel 110 in the direction of the optical axis L may be minimized so that a photographing apparatus having a small thickness may be obtained.

Figure 13:
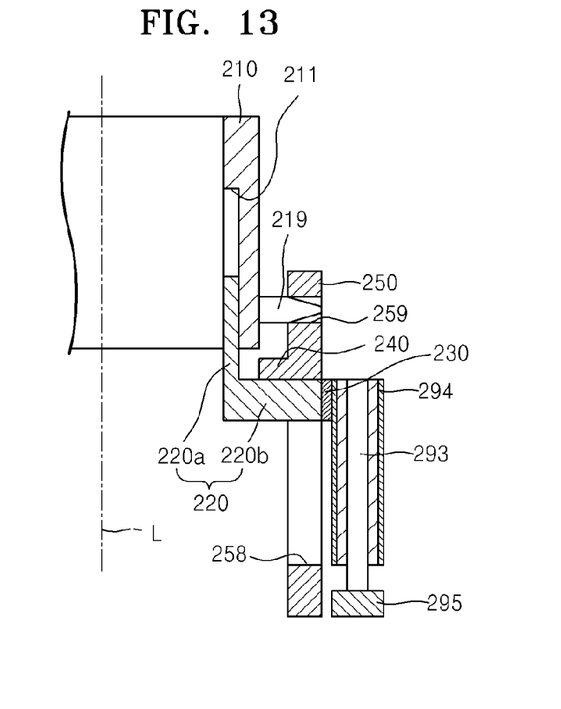
FIG. 13 is a side cross-sectional view schematically illustrating an operating state of a lens barrel assembly, according to another embodiment.

FIG. 13 is a side cross-sectional view schematically illustrating an operating state of a lens barrel assembly, according to another embodiment.

The lens barrel assembly illustrated in FIG. 13 includes a barrel 210 that is moved in a direction along an optical axis L or is rotated about the optical axis L, a moving plate 220 that is combined with the barrel 210 to be movable in the direction along the optical axis L, and a power transmission unit 230 that is installed on the outside of the moving plate 220 and transmits a rotation force from the outside to the barrel 210 via the moving plate 220. The power transmission unit 230 may be a gear or a frictional ring that is manufactured of rubber, or the like.

A guide groove 211 is formed on the inside of the barrel 210, and the moving plate 220 is coupled to the inside of the barrel 210. A sliding portion 220a of the moving plate 220 is slidably inserted into the guide groove 211. An extension portion 220b is combined with an end of the sliding portion 220a and protrudes outwardly from the moving plate 220. The power transmission unit 230 is installed at an end of the extension portion 220b.

An external barrel 250 is disposed at an outside of the barrel 210. The external barrel 250 includes an external long hole 258 through which the power transmission unit 230 is exposed to the outside. A rotation shaft 293 is disposed on the outside of the external barrel 250 and is rotated by the driving unit 295.

A transmission element 294 is installed on the outside of the rotation shaft 293 and contacts the power transmission unit 230 via the external long hole 258.

As the rotation shaft 293 is rotated, a rotation force is transmitted to the power transmission unit 230 via the transmission element 294 so that the rotation force may be transmitted to the barrel 210 via the moving plate 220.

A first protrusion 219 is installed on the outside of the barrel 210 and is inserted into a first cam groove 259 of the external barrel 250. When the rotation force is transmitted to the power transmission unit 230, the rotation force is transmitted to the barrel 210 via the moving plate 220 so that the moving plate 220 and the barrel 210 may be rotated about the optical axis L together.

While the barrel 210 is rotated, the first protrusion 219 is guided by the first cam groove 259 so that the barrel 210 and the moving plate 220 make a rectilinear motion in the direction along the optical axis L. When the moving plate 220 contacts the stopper 240, the moving plate 220 does not move in the direction along the optical axis L any more, and the moving plate 220 remains continuously inserted into the guide groove 211 of the barrel 210 so that the rotation force transmitted via the power transmission unit 230 may be transmitted to the barrel 210 via the moving plate 220.

In the lens barrel assembly having the above structure, the length of the transmission element 294 for rotating the barrel 210 in the direction of the transmission element 294 may be minimized so that a photographing apparatus having a small size may be obtained.

Figure 14:
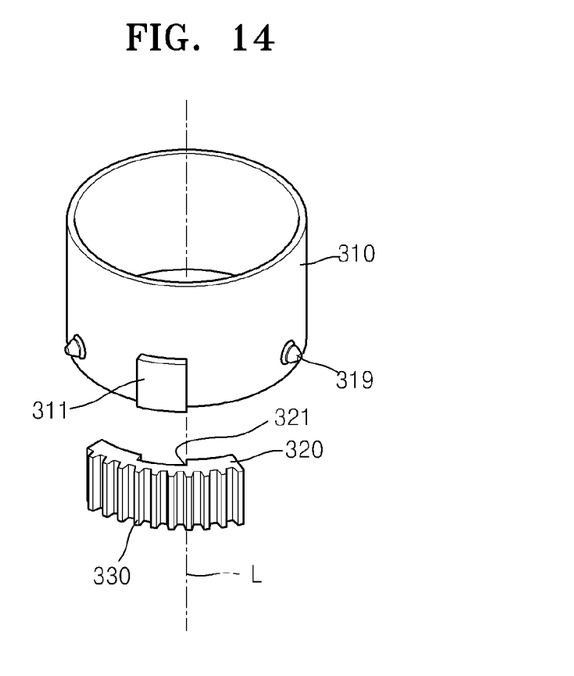
FIG. 14 is a perspective view schematically illustrating the combination relationship between some elements of a lens barrel assembly, according to another embodiment.

FIG. 14 is a perspective view schematically illustrating the combination relationship between some elements of a lens barrel assembly, according to another embodiment.

The lens barrel assembly illustrated in FIG. 14 has a modified structure in which a barrel 310 and a moving plate 320 are combined with each other.

The barrel 310 includes a straight-shaped protrusion 311 that is disposed on the outside of the barrel 310 and extends in a direction substantially parallel to an optical axis L. The barrel 310 further includes a first protrusion 319 that is installed on the outside of the barrel 310. The moving plate 320 includes a straight-shaped guide groove 321 into which the straight-shaped protrusion 311 of the barrel 310 is inserted. Due to this structure, the barrel 310 and the moving plate 320 may be moved with respect to each other in the direction substantially parallel to the optical axis L.

Gear teeth 330, that is, an example of a power transmission unit, are formed on an outer peripheral surface of the moving plate 320 along a circumferential direction of the moving plate 320. The gear teeth 330 transmit a rotation force from the outside to the moving plate 320.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Expression, such as "including", "comprising", or the like, is used to be understood as the term of an open type conclusion part of description.

The use of the terms "a", "an", "the", and similar referents in the context of describing the invention (especially in the context of the following claims) is to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by the context. The use of any and all examples, or exemplary language (e.g., "such as") provided herein, is intended merely to better illustrate the invention and does not limit the scope of the invention unless otherwise claimed. Numerous modifications and adaptations will be readily apparent to those skilled in this art without departing from the spirit and scope of the invention.

As described above, in a lens barrel assembly and a photographing apparatus including the lens barrel assembly according to the one or more embodiments of the invention, since a lens barrel and a power transmission unit are moved with respect to each other in a direction of an optical axis, a height required to drive the lens barrel while guaranteeing a sufficient stroke length of the lens barrel can be minimized. In addition, the lens barrel can be smoothly moved in the direction along the optical axis so that a stable and smooth zooming function can be performed.

While the present invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A lens barrel assembly comprising:
   a lens barrel that is rotatable about an optical axis and is movable in a direction along the optical axis;
   a moving plate that is combined with the lens barrel so that the moving plate is rotated together with the lens barrel and is movable with respect to the lens barrel in the direction along the optical axis;
   a power transmission unit that is installed on the moving plate and transmits an outside rotation force to the lens barrel via the moving plate;
   a stopper that is disposed on a path along which the moving plate moves in the direction along the optical axis and that limits a movement of the moving plate in the direction along the optical axis in a partial section of the path on which the lens barrel is moved; and
   an external barrel that comprises a first cam groove that is disposed outside of the lens barrel and that guides a movement of a first protrusion of the lens barrel;
   wherein:
      the lens barrel comprises a guide groove that is substantially parallel to the optical axis,
      the moving plate is inserted in the guide groove so as to be movable along the guide groove in the direction along the optical axis,
      the guide groove is formed on an outside surface of the lens barrel,
      the moving plate comprises a long hole that extends in the direction substantially parallel to the optical axis, and
      the first protrusion of the lens barrel passes through the long hole and protrudes outwardly to connect to the first cam groove.

2. The lens barrel assembly of claim 1, wherein:
   the guide groove comprises wedge grooves that are formed in edges into which the moving plate is inserted, and the wedge grooves are inclined, in a radial direction of the lens barrel, from outside of the lens barrel toward inside of the lens barrel, and
   the moving plate comprises wedges corresponding to the wedge grooves.

3. The lens barrel assembly of claim 1, further comprising a driving unit,
   wherein the moving plate extends along at least a portion of the lens barrel in a circumferential direction of the lens barrel,
   the power transmission unit comprises a plurality of gear teeth formed on an outer peripheral surface of the moving plate along a circumferential direction of the moving plate,
   the external barrel comprises an external long hole through which the plurality of gear teeth are exposed to the outside, and
   the driving unit rotates the gear teeth through the external long hole.

4. The lens barrel assembly of claim 3, wherein the stopper is installed inside the external barrel.

5. The lens barrel assembly of claim 1, further comprising:
   a movement frame that is disposed inside the lens barrel, supports an optical element, and comprises a second protrusion that protrudes outwardly; and
   a cam barrel that comprises a second cam groove through which the second protrusion passes, and is disposed between the movement frame and the lens barrel so as to guide the movement frame to be movable with respect to the lens barrel,
   wherein the lens barrel comprises a straight-shaped groove that extends substantially parallel to the optical axis, and the second protrusion of the movement frame is inserted into the straight-shaped groove.

6. The lens barrel assembly of claim 1, wherein the power transmission unit comprises:
   a frictional ring that is formed on a surface of the moving plate and extends along a circumferential direction of the moving plate; and a transmission element that contacts the frictional ring, is rotated and transmits an outside driving force to the moving plate.

7. The lens barrel assembly of claim 1, wherein:
the lens barrel comprises a straight-shaped protrusion that protrudes from an outer surface of the lens barrel and extends substantially parallel to the optical axis, and
the moving plate comprises a straight-shaped guide groove into which the straight-shaped protrusion is inserted.

8. A photographing apparatus comprising:
a lens barrel assembly comprising:
   a lens barrel that is rotatable about an optical axis and is movable in a direction along the optical axis,
   a moving plate that is combined with the lens barrel so that the moving plate is rotated together with the lens barrel and is movable with respect to the lens barrel in the direction substantially parallel to the optical axis,
   a power transmission unit that is installed on the moving plate and transmits an outside rotation force to the lens barrel via the moving plate, and
   a stopper that is disposed on a path along which the moving plate moves in the direction along the optical axis and that limits a movement of the moving plate in the direction along the optical axis in a partial section of the path on which the lens barrel is moved; and
an image capturing element that converts light passing through the lens barrel assembly into an electrical signal;
wherein:
   the lens barrel comprises a guide groove that is substantially parallel to the optical axis, and
   the moving plate is inserted in the guide groove so as to be movable along the guide groove in the direction along the optical axis;
   the guide groove is formed on an outside surface of the lens barrel,
   the moving plate comprises a long hole that extends in the direction substantially parallel to the optical axis,
   the lens barrel comprises a first protrusion that passes through the long hole and protrudes outwardly, and
   the lens barrel assembly further comprises an external barrel that comprises a first cam groove that guides a movement of the first protrusion and is disposed outside the lens barrel.

9. The photographing apparatus of claim 8, wherein:
the guide groove comprises wedge grooves that are formed in edges into which the moving plate is inserted, and the wedge grooves are inclined, in a radial direction of the lens barrel, from outside of the lens barrel to inside of the lens barrel, and
the moving plate comprises wedges corresponding to the wedge grooves.

10. The photographing apparatus of claim 8, wherein:
the moving plate extends along at least a portion of the lens barrel in a circumferential direction of the lens barrel, and
the power transmission unit comprises a plurality of gear teeth formed on an outer peripheral surface of the moving plate along a circumferential direction of the moving plate,
the external barrel comprises an external long hole through which the plurality of gear teeth are exposed to the outside, and
the lens barrel assembly further comprises a driving unit that rotates the gear teeth through the external long hole.

11. The photographing apparatus of claim 10, wherein the stopper is installed inside the external barrel.

12. The photographing apparatus of claim 8, wherein the lens barrel comprises a straight-shaped groove that extends substantially parallel to the optical axis, and
the lens barrel assembly further comprises:
   a movement frame that is disposed inside the lens barrel, supports an optical element, comprises a second protrusion that protrudes outwardly, and is inserted into the straight-shaped groove; and
   a cam barrel that comprises a second cam groove through which the second protrusion passes, and is disposed between the movement frame and the lens barrel so as to guide the movement frame to be movable with respect to the lens barrel.

13. The photographing apparatus of claim 8, wherein the power transmission unit comprises:
   a frictional ring that is formed on a surface of the moving plate and extends along the circumferential direction of the moving plate; and
   a transmission element that contacts the frictional ring, is rotated and transmits an outside driving force transmitted to the moving plate.

* * * * *